(12) United States Patent
Anglin

(10) Patent No.: US 6,260,069 B1
(45) Date of Patent: *Jul. 10, 2001

(54) DIRECT DATA RETRIEVAL IN A DISTRIBUTED COMPUTING SYSTEM

(75) Inventor: Matthew Joseph Anglin, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/021,499

(22) Filed: Feb. 10, 1998

(51) Int. Cl.$^7$ .............................. G06F 15/16; G06F 15/73
(52) U.S. Cl. .......................... 709/229; 709/213; 709/214; 709/215; 709/216; 707/204; 714/6; 714/12
(58) Field of Search ..................................... 709/229, 213, 709/214, 215, 216, 223, 203; 707/10, 201, 202, 204, 1, 8; 713/100; 714/6, 12

(56) References Cited

U.S. PATENT DOCUMENTS

| 5,005,122 | * | 4/1991 | Griffin et al. | 709/203 |
| 5,434,994 | * | 7/1995 | Shaheen et al. | 709/223 |

(List continued on next page.)

FOREIGN PATENT DOCUMENTS

| 0 574 900 A2 | 12/1993 | (EP) . |
| 0 773 503 A2 | 5/1997 | (EP) . |
| 2 288 477 | 10/1995 | (GB) . |
| 8044609 | * 1/1995 | (JP) . |
| 8202602 | * 1/1995 | (JP) . |

OTHER PUBLICATIONS

ACM Computing Surveys, vol. 22, No. 4, Dec. 1990, "Distributed File Systems: Concepts and Examples" by Eliezer Levy and Abraham Silberschatz.

IBM Corporation's International Technical Support Organization "ADSM concepts", SG24–4877–00, Feb. 1997, Chapters 1 & 6.

IBM Corporation's ADSTAR Distributed Storage Manager "Using the UNIX Backup–Achive Clients", Version 3, Release 1, SH26–4075–01, Chapters 1 & 3.

IBM Corporation's ADSTAR Distributed Storage Manger for HP–UX "Administrator's Guide", Version 3, GC35–0320–00 Chapters 4 & 12.

La Polla, Stephanie, "Auspex aims for full server uptime.", PC Week v12 n13, p. 43, Aug. 1995.*

Brown et al., "Dynamic snooping in fault–tolerant distribuuted shared memory", Distriubuted Computing Systems Conference, pp. 218–226, Jun. 1994.*

Cabrera et al., "ADSM:a multi–platform, scalable, backup and archive mass storage system", Technologies for the Information Superhighway, pp. 420–427, Mar. 1995.*

Primary Examiner—Mark H. Rinehart
Assistant Examiner—Almari Romero
(74) Attorney, Agent, or Firm—David W. Victor; Konrad Raynes & Victor

(57) ABSTRACT

Disclosed is a system for backing up files in a distributed computing system, such as a distributed file system. A backup request is initiated with a backup client program to backup a requested file. A determination is made as to whether the requested file is maintained in a shared name space. The backup client program and a backup server program are capable of accessing files maintained in the shared name space. The file server maintains the files in the shared name space. The backup request is transmitted to the backup server program upon determining that the requested file is maintained in the shared name space. The backup server program transmits a message to the file server to provide the requested file. The file server transmits the requested file to the backup server program. The backup server program stores the requested file in a storage device.

24 Claims, 2 Drawing Sheets

U.S. PATENT DOCUMENTS

| | | | |
|---|---|---|---|
| 5,452,448 | * 9/1995 | Sakuraba et al. | 707/201 |
| 5,495,533 | * 2/1996 | Linehan et al. | |
| 5,588,147 | * 12/1996 | Neeman et al. | 707/1 |
| 5,628,005 | 5/1997 | Hurvig | 707/8 |
| 5,649,196 | * 7/1997 | Woodhill et al. | 707/204 |
| 5,673,381 | * 9/1997 | Huei et al. | 714/1 |
| 5,689,701 | * 11/1997 | Ault et al. | 707/10 |
| 5,713,017 | * 1/1998 | Lin et al. | 707/8 |
| 5,813,017 | * 9/1998 | Morris | 707/204 |
| 5,832,522 | * 11/1998 | Blickenstaff et al. | 707/204 |
| 5,857,102 | * 1/1999 | McChesney et al. | 713/100 |
| 5,867,650 | * 2/1999 | Osterman | 709/203 |
| 5,918,228 | * 6/1999 | Rich et al. | 707/10 |
| 6,026,414 | * 2/2000 | Anglin | 707/204 |
| 6,148,412 | * 11/2000 | Cannon et al. | 714/6 |

* cited by examiner

DIRECT DATA RETRIEVAL IN A DISTRIBUTED COMPUTING SYSTEM

1. FIELD OF THE INVENTION

Preferred embodiments of the present invention relate to a system for direct data retrieval in a distributed computing system to backup files in the system at an attached storage device.

2. BACKGROUND OF THE RELATED ART

In a distributed computing system, different computers, operating systems, and networks interact as if they were all part of a single system. The file system has a single set of global file names. A particular machine in the system need not know where the file is physically located. Instead, the file may be accessed anywhere in the network using the global file name. Global file names are part of the shared name space which devices within the distributed file system may access. One such distributed file system is the Andrew File System (AFS) available through Transarc, Corporation (Transarc). An AFS server performs file mapping between the directory name of a file and the location, making the file space location independent. With file independence, a user at a workstation linked to the network need only know the global file name, which includes the path name, and not the physical location of the file.

Another distributed system, is the Distributed File System (DFS), available from Transarc and International Business Machines, Corp. (IBM), which is a component of the Distributed Computing Environment (DCE) standard promulgated by the Open Software Foundation (OSF). The DFS and AFS systems allow users to have access to data throughout the network. Any changes made by one user to a file is available to all users. The DFS and AFS systems provide authentication services to provide security and limit access to only authorized users.

The AFS system offered by Transarc includes a backup program called "butc" (Backup Tape Coordinator). Butc is a volume backup system used to dump volume images to tape devices attached to the file server. However, the minimum backup unit for the butc program is a volume as the butc program does not provide support for file-level backup and recovery.

Hierarchical storage management programs, such as the IBM Adstar Distributed Storage Management (ADSM) product, provide backup/archive support and migrate less frequently used files to secondary storage to free space in primary storage. The ADSM server provides hierarchical storage management and backup/archive functions, and manages the storage of files on tape drives, optical disks, and other storage medium. The ADSM backup feature saves copies of files from the primary storage in a client computer to the secondary storage space managed by the ADSM server. Thus, data at a client computer running an ADSM client is protected in the event of data loss due to a hardware or software failure, accidental deletion, and/or logical corruption. With the ADSM program, clients can backup volumes, directories, subdirectories or files. ADSM allows incremental backup of only those files that have been changed. In this way, ADSM avoids the need to do a full dump to backup as only those modified files are backed up. This incremental backup reduces network utilization and traffic. The IBM ADSM product is described in "ADSM Version 2 Presentation Guide," (IBM Document SG24-4532-00, International Business Machines, copyright 1995), which publication is incorporated herein by reference in its entirety.

IBM has combined its ADSM product with AFS and DFS file servers to provide backup support for these products. An AFS or DFS server would include an ADSM client to backup files to an ADSM server. In such case, the ADSM server backs-up files from the AFS or DFS server to a secondary storage device the ADSM server manages. One problem with using such backup software in a distributed file system is that the client managing backup operations, such as the ADSM client, must read a file to be backed-up. This reading operation consumes network resources. The ADSM client must then consume network resources again by transferring the read file to the ADSM server. Network traffic is further increased if the ADSM client is on a separate machine from the AFS/DFS server. The IBM publications entitled "ADSM AFS/DFS Backup Clients Version 2.1" (IBM Document SH26-4048-00, International Business Machines, copyright 1996) and "ADSM Concepts" (IBM Document SG24-4877-00, International Business Machines, copyright 1997) describes the use of the ADSM software in an AFS/DFS distributed file system. These publications are incorporated herein by reference in their entirety.

SUMMARY OF THE INVENTION

To address the shortcomings in the prior art described above, preferred embodiments of the present invention provide a system for backing up files in a distributed computing system. A backup request is initiated with a backup client program to backup a requested file. A determination is made as to whether the requested file is maintained in a shared name space. The backup client program and a backup server program are capable of accessing files maintained in the shared name space. A file server maintains the files in the shared name space. The backup request is transmitted to the backup server program upon determining that the requested file is maintained in the shared name space. The backup server program transmits a message to the file server to provide the requested file. The file server transmits the requested file to the backup server program. The backup server program stores the requested file in a storage device.

In further embodiments, the backup client program is on a first computer machine, the backup server program is on a second computer machine, and the file server is on a third computer machine. The first computer, second computer, and third computer communicate over a network system.

In yet further embodiments, the backup client program and backup server program are on a first computer machine and the file server program is on a second computer machine. The first computer machine and second computer machine communicate over a network system.

It is an object of preferred embodiments of the present invention to provide a system for backing up files in a shared name space maintained in a file server which is part of a distributed computing environment on a storage device managed by a backup server program, such as a hierarchical storage management program.

It is yet a further object to reduce network traffic throughout the distributed computing environment by having the backup server program handle requests by a client computer to backup files maintained in the file server on the storage device managed by the server program.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
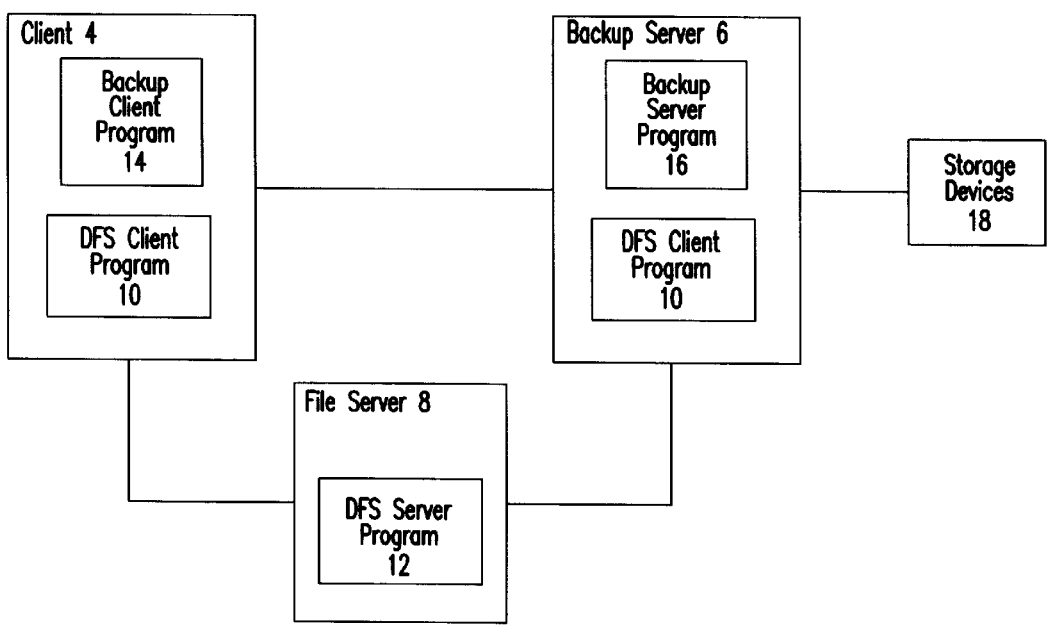
FIG. 1 is a block diagram illustrating a software and hardware environment in which preferred embodiments of the present invention are implemented.
Figure 2:
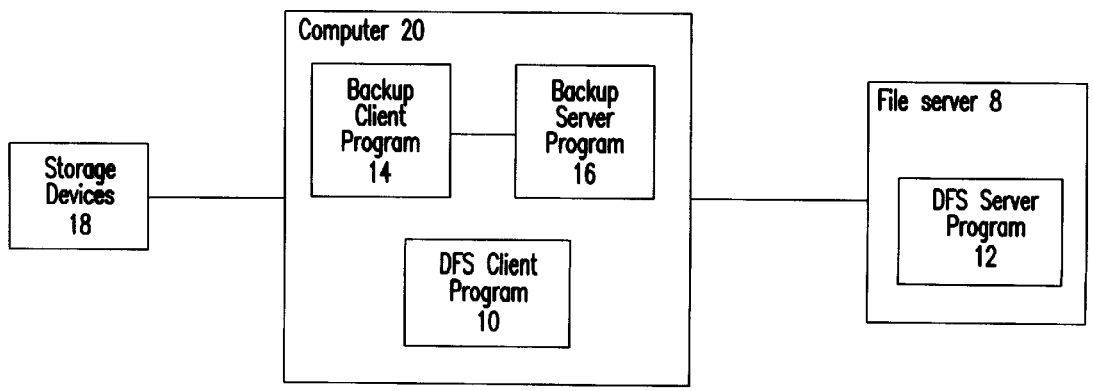
FIG. 2 is a block diagram illustrating an alternative software and hardware environment in which preferred embodiments of the present invention are implemented.

FIGS. 1 and 2 illustrate hardware and software environments in which preferred embodiments of the present invention are implemented. FIG. 1 illustrates a distributed computing system 2 including three separate computing machines—a client 4, a backup server 6, and a file server 8. These three separate computing machines may be comprised of a personal computer, workstation, mainframe, etc. The computers 4, 6, 8 would include an operating system such as AIX, O/S 2, Unix, Microsoft Windows, etc. These three separate machines 4, 6, 8 include software to allow the machines to function as components in a distributed computing environment 2, such as the IBM and Transarc DCE products. The computers 4, 6, 8 may communicate via any suitable network architecture known in the art, such as LAN, Ethernet, WAN, SNA networks, Token Ring, LocalTalk, TCP/IP, the Internet, etc.

The client 4 and backup server 6 include a distributed file system (DFS) client program 10 that provides communication with the file server 8. The file server 8 includes a DFS server program 12 that makes data available to other machines within the distributed computing system 2 and runs various file management processes. The distributed computing system 2 may be implemented in distributed file system products such as the AFS and DFS products provided by Transarc, the IBM Distributed Computing Environment (DCE) products, the Network File Server products from Sun Microsystems, Inc., etc. The terms "DFS client program" and "DFS server program" as used herein refer generally to a distributed file system and not to any particular commercially available DFS system. The DFS client program 10 includes a communication protocol to allow the client 4 and backup server 6 to interface with the DFS server program 12 in the file server 8. In preferred embodiments, the file server client program 10 may include the DCE Remote Procedure Call (RPC) to interface with the file server 8. Machines running the DFS client program 4 may access files in a shared name space regardless of where those files are physically located. The files would conform to a uniform global name space, providing attached machines 4, 6, 8 with a global view of a set of files and directories independent of machine boundaries. The DFS program 12 manages and creates the shared name space, and makes such shared name space available to any clients including the DFS client program. The client 4 and backup server 6 all have access to the same shared name space and use the same global naming system in the distributed computing system 2. This allows access to the shared name space regardless of where the client 4, backup server 6, and file server 8 are located.

The file server 8 or some other machine could perform authentication services for clients 4 attempting to access files in a file server 8. When a user at a client 4 logs in, the client 4 requests a ticket to allow it to access certain files maintained in the file server 8. When the client 4 attempts to access a file in the shared name space and stored in the file server 8, the client 4 must present the ticket. The file server 8 would examine the ticket to determine whether the client 4 has authorization to access the requested file from the file server 8.

The client 4 further includes a backup client program 14 that allows the client 4 to communicate with the backup server 6 to backup data to which the client 4 has access. The backup client program 14 may be comprised of any program that allows a client to backup and archive data at a server, such as the ADSM client. The backup server 6 includes a backup server program 16 that stores and manages data in storage devices 18. The storage devices 18 may be comprised of any non-volatile memory device suitable for long term storage of data, such as a tape library, optical disk library, hard disk drives, etc. The backup server program 16 may include a database program to manage and track the location of data in the storage devices 18. The backup server program 16 further includes communication protocol software to communicate with the backup client program 14. The back-up server program 16 may be comprised of any program that allows a server to manage and backup data in an attached storage device 18, such as the ADSM server program. The backup client program 14 and backup server program 16 may also provide hierarchical storage management functions, such as migrating infrequently used data from a device including the backup client program 16 to the storage devices 18 and transparently recalling data from the storage devices 18 when migrated data is requested by a backup client program 14. The backup server 6 backs up data from the file server 8 or any files the client 4 seeks to backup from the file server 8.

FIG. 2 illustrates an alternative embodiment where the backup client program 14 and the backup server program 16 are located on a same computer machine (node) 20. In such case, the backup client 14 and backup server 16 programs may communicate using the memory of the computer 20. For instance, ADSM provides a shared memory protocol that uses a memory area on the computer machine to transfer data between the ADSM client and server. The backup client program 14 would access and read data and transmit such data through a shared memory space to the backup server program 16. The backup server program 16 would read the data copied to the shared memory space and then manage the storage of the transmitted data to the storage devices 18. As with the embodiment in FIG. 1, the backup client program 14 and backup server program 16 share the same global file name space through the file server client program 10 which provides access to the file server 8 and files maintained therein. In addition, in the embodiment of FIG. 2, the backup client program 14 and backup server program 16 share the name space of common storage areas within the computer 20. The computer 20 executes the DFS client program 10 to interface with the DFS server program 12 and access files in the shared name space maintained in the file server 8.

Thus, the preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIGS. 1 and 2 is not intended to limit the present invention. Indeed, those skilled in the art will recognize that other alternative hardware environments and programs may be used without departing from the scope of the present invention.

Direct Data Retrieval by the Backup Server

Figure 3:
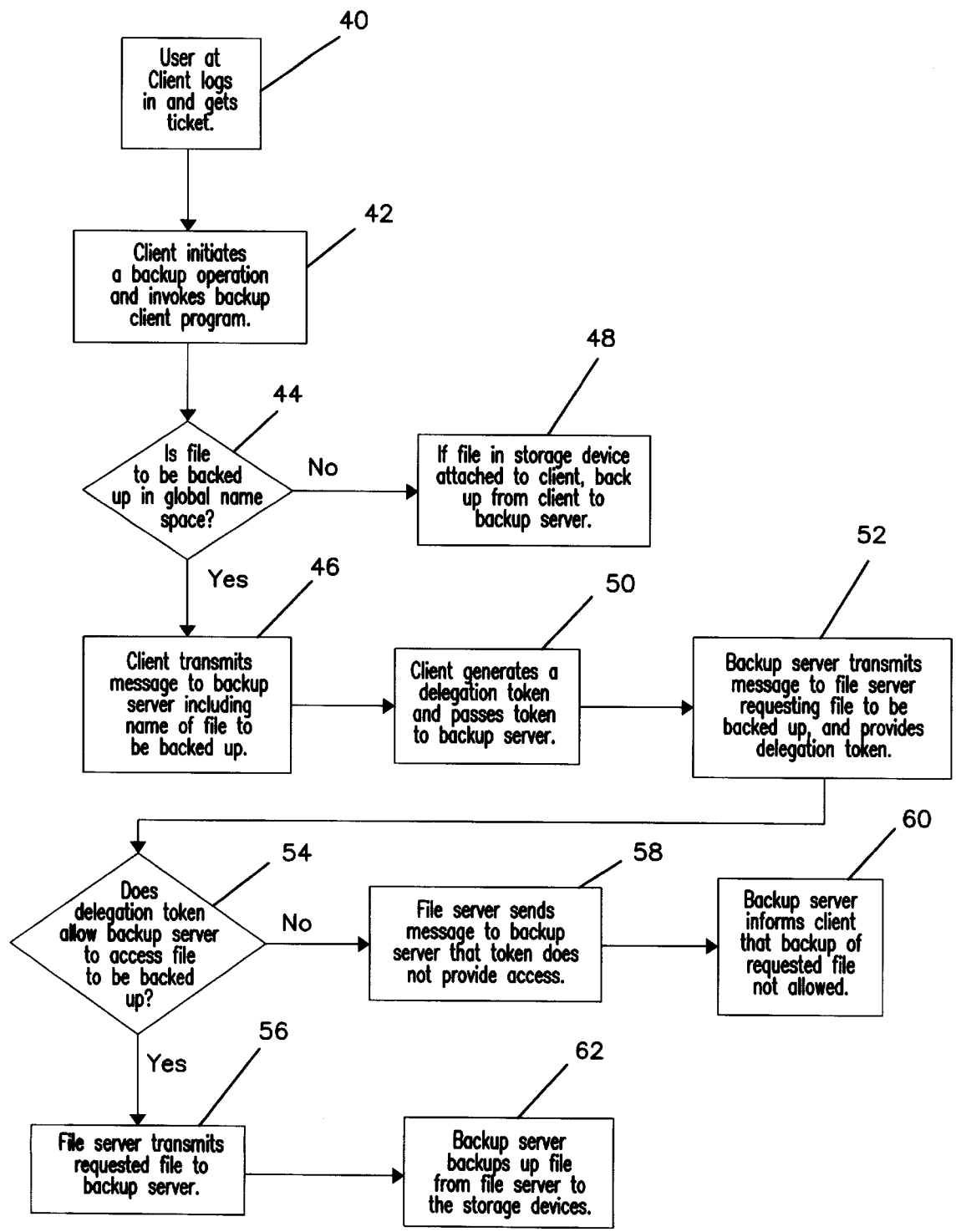
FIG. 3 is a flowchart showing logic to retrieve and backup data in accordance with preferred embodiments of the present invention.

FIG. 3 is a flowchart illustrating logic implemented in the programs 10, 12, 14, 16 described in FIGS. 1 and 2 to back-up files maintained in the file server 8 in storage devices 18 managed by the backup server program 16. Those skilled in the art will recognize that this logic is provided for illustrative purposes only and that different logic may be used to accomplish the same results.

Control begins at block 40 which represents a user logging in at the client 4 to access the distributed computing system 2 and files maintained in the shared name space stored managed by the file server 8. An authentication service (not shown) located within the distributed computing system 2 would issue a session authentication ticket to the client 4 indicating the level of access the client 4 has to files maintained in the file server 8. An example of an authentication service is the DCE Generic Security Service Application Programming Interface (GSSAPI) that provides security services to applications using peer-to-peer communication. Other suitable authentication protocols and services known in the art may be used, such as the DCE RPC authentication services and the Kerberos authentication protocol. The authentication ticket provides access to services and files offered throughout the distributed computing system 2, including files maintained in the file server 8. Control then transfers to block 42 which represents the client 4 initiating an operation to backup one or more files from the file server 8. In preferred embodiments, the client 4 seeks to back-up a file. The term "file" as used herein refers to an individual file, logical unit, entire volume, directory, subdirectory or any other image of data maintained in the shared global file system.

Control transfers to block 44 which is a decision block representing the client 4, operating under control of the DFS client program 10, determining whether the file to be backed up is in the global name space. If so, control transfers to block 46; otherwise, control transfers to block 48. Block 48 represents the situation where the client is attempting to backup a local file that is not in the shared global name space. In such case, the client 4 transmits the local file to the backup server program 16 in the backup server 6 for storage in the storage devices 18. If the file is part of the shared global name space, then control transfers to block 46 which represents the client 4 transmitting a message to the backup server program 16 in the backup server 6 including the name of the file to be backed up.

Control then transfers to block 50 which represents the client 4 calling a procedure, such as an application program interface (API) to establish delegation and pass a delegation token to the backup server 6. The delegation token generated by the client 4 would specify the scope of access on behalf of the delegator the token provides. In preferred embodiments, the client could utilize a delegation protocol, such as the IBM DCE delegation protocol, which allows intermediary servers to act on behalf of an initiating client while preserving the client and server identities and access control attributes. Thus, the intermediary server, such as the backup server 6, can utilize and pass the identity of client 4 without altering the authentication level of the backup server 6.

Control then proceeds to block 52 which represents the backup server program 16 transmitting a message to the file server 8 using the DFS client program 10 as an interface. This message includes the global file name of the file the client 4 requested to backup and the delegation token generated by the client 4. Control then transfers to block 54 which is a decision block representing the DFS server program 12 in the file server 8 determining whether the client 4 delegation token transmitted from the backup server 6 permits access to the file requested to be backed up. If so, control transfers to block 56; otherwise, control transfers to block 58. If the client 4 delegation token does not permit access to the requested file, then control transfers to block 58 which represents the file server 8 transmitting a message to the backup server 6 via the DFS server client program 10 indicating that the delegation token does not permit access to the requested file. Control then proceeds to block 60 representing the backup server 6 informing the client 4 that the client 4 authorization level did not permit access to the requested file.

If the client 4 delegation token permits access to the requested file, then control transfers to block 56 which represents the DFS server program 12 transmitting the requested file to the backup server 6 via the DFS client program 10. Control then transfers to block 62 which represents the backup server program 16 backing up the file transmitted from the file server 8 to the storage devices 18.

The logic described in FIG. 3 is implemented in a distributed computing system 2 in which the backup client program 14 and backup server program 16 are on separate computers 4, 6, such as the environment described in FIG. 1. In the alternative embodiment of FIG. 2, the backup client 14 and backup server 16 programs are installed on the same computer 20. In such case, at block 46, the backup client program 14 would transmit the message indicating the file to be backed up via a shared memory space and not an external transmission line as is the case with FIG. 1.

With the above described preferred embodiments network traffic is reduced because the client 4 does not have to read the file from the file server 8 and then transmit the file to the backup server 6 via the backup programs 14, 16. Instead, in preferred embodiments, transmission of a file in the shared name space from the file server 8 only occurs once—when requested by the backup server program 16 via the DFS client program 10. Moreover, the client 4 cannot bypass authentication by going through the backup server 6 to backup files in the file server 8 because the backup server 6 must use a delegation token provided by the client 4 to access files in the file server 8. The delegation token from the client 4 cannot provide greater access than that allowed to the client 4.

Conclusion

This concludes the description of the preferred embodiments of the invention. The following describes some alternative embodiments for accomplishing the present invention.

Preferred embodiments utilize current available products, such as ADSM, DFS, AFS, and NFS. However, any suitable program capable of performing the functions described herein could be substituted for the preferred embodiments described herein.

In preferred embodiments, certain operations are described as being performed by certain computer programs 10, 12, 14, 16. However, those skilled in the art will appreciate that an alternative combination of programs could be used to implement the logic of preferred embodiments of the invention. In the embodiment of FIG. 1 certain programs 10, 12, 14, 16 are described as implemented on three machines 4, 6, 8. In alternative embodiments, these programs 10, 12, 14, 16 may be implemented on a different number and arrangement of computer machines than the computer machine arrangement described in FIGS. 1 and 2.

In summary, preferred embodiments disclose a system for backing up files in a distributed computing system. A backup request is initiated with a backup client program to backup a requested file. A determination is made as to whether the requested file is maintained in a shared name space. The backup client program and a backup server program are capable of accessing files maintained in the shared name space. A file server maintains the files in the shared name space. The backup request is transmitted to the backup server program upon determining that the requested file is maintained in the shared name space. The backup server program transmits a message to the file server to provide the requested file. The file server transmits the requested file to the backup server program. The backup server program then stores the requested file in a storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for backing up files in a distributed computing system, comprising:
    initiating a backup request with a backup client program to backup a requested file;
    determining, by the backup client program, whether the requested file is maintained in a shared name space, wherein the backup client program and a backup server program have access to files maintained in the shared name space, and wherein a file server maintains files in the shared name space;
    transmitting, by the backup client program, the backup request to the backup server program upon determining that the requested file is maintained in the shared name space;
    transmitting a message by the backup server program to the file server to provide the requested file;
    transmitting the requested file by the file server to the backup server program, wherein the requested file is not transferred to the backup client program; and
    storing by the backup server program the requested file in a storage device.

2. The method of claim 1, wherein the backup client program is on a first computer machine, the backup server program is on a second computer machine, and the file server is on a third computer machine, wherein the first computer, second computer, and third computer communicate over a network system.

3. The method of claim 2, wherein the first computer machine and second computer machine include a distributed file system (DFS) client program and wherein the file server includes a DFS server program, wherein the DFS client program interfaces the first and second computer machines with the DFS server program to access files in the shared name space.

4. The method of claim 2, further including the steps of:
    issuing an authentication ticket to the client providing the client access to certain files in the shared name space;
    generating a delegation token with the client, wherein the delegation token allows the backup server to access files in the shared name space on behalf of the client with a level of access not greater than the access provided by the client authentication ticket;
    transmitting the delegation token from the client to the backup server;
    transmitting the delegation token from the backup server to the file server;
    determining with the file server whether the delegation token permits the backup server to access the requested file; and
    wherein the step of transmitting the requested file with the file server to the backup server including the backup server program occurs after determining that the delegation token permits access to the requested backup file.

5. The method of claim 1, wherein the backup client program and backup server program are on a first computer machine and the file server is on a second computer machine, wherein the first computer machine and second computer machine communicate over a network system.

6. The method of claim 5, wherein the backup client program and backup server program communicate via a shared memory within the first computer machine.

7. The method of claim 5, wherein the first computer machine includes a distributed file system (DFS) client program and wherein the file server includes a DFS server program, wherein the DFS client program in the first computer machine interfaces with the DFS server program to allow the first computer machine to access files in the shared name space.

8. The method of claim 1, further comprising:
    transmitting the requested file with the backup client program to the backup server program upon determining that the requested file is not maintained in the shared name space.

9. A distributed computing system for backing up files in a shared name space, comprising:
    (a) a backup client program, including means for initiating a backup request to backup a requested file;
    (b) a backup server program;
    (c) a file server, wherein the file server maintains files included in a shared name space, wherein the backup client program and backup server program are capable of accessing files maintained in the shared name space;
    (d) means, performed by the backup client program, for determining whether the requested file is included in the shared name space;
    (e) means, performed by the backup client program, for transmitting the backup request to the backup server program upon determining that the requested file is included in the shared name space;
    (f) means, performed by the backup server program, for transmitting a message to the file server to provide the requested file;

(g) means, performed by the file server, for transmitting the requested file to the backup server program, wherein the requested file is not transferred to the backup client program; and (h) means, performed by the backup server program, for storing the requested file in a storage device.

10. The distributed computing system of claim 9, further including:

a first computer machine including the backup client program;

a second computer machine including the backup server program;

a third computer machine including the file server; and a network system providing communication among the first computer, second computer, and third computer.

11. The distributed computing system of claim 10, further including:

a distributed file system (DFS) client program included within the first computer machine and the second computer machine; and a DFS server program included in the file server, wherein the DFS client program interfaces the first and second computer machines with the DFS server program to allow the first and second computer machines to access files in the shared name space.

12. The distributed computing system of claim 10, further including:

means for issuing an authentication ticket to the client providing the client access to certain files in the shared name space;

means, performed by the client, for generating a delegation token that allows the backup server to access files in the shared name space on behalf of the client with a level of access not greater than the access provided by the client authentication ticket;

means for transmitting the delegation token from the client to the backup server program;

means for transmitting the delegation token from the backup server to the file server; and means, performed by the file server, for determining whether the delegation token permits access to the requested file, wherein the file server transmits the requested file to the second machine after determining that the delegation token permits access to the requested backup file.

13. The distributed computing system of claim 9, further including:

a first computer machine including the backup client program and the backup server program;

a second computer machine including the file server;

a network system providing communication between the first computer machine and the second computer machine.

14. The distributed computing system of claim 13, further including a shared memory within the first computer machine, wherein the backup client program and backup server program communicate via the shared memory.

15. The distributed computing system of claim 13, further including:

a distributed file system (DFS) client program in the first computer machine;

a DFS server program included in the file server, wherein the DFS client program interfaces the backup server program with the DFS server program to access files in the shared name space maintained on the file server.

16. The distributed computing system of claim 9, further comprising:

means for transmitting the requested file with the backup client program to the backup server program upon determining that the requested file is not maintained in the shared name space.

17. An article of manufacture for use in programming a distributed computing system, the article of manufacture comprising a computer readable storage medium having at least one computer program embedded therein that causes a backup client program, backup server program, and file server within the distributed computing system to perform:

initiating a backup request by the backup client program to backup a requested file;

determining, by the backup client program, whether the requested file is maintained in a shared name space, wherein the backup client program and backup server program have access to files maintained in the shared name space, and wherein the file server maintains files in the shared name space;

transmitting, by the backup client program, the backup request to the backup server program upon determining that the requested file is maintained in the shared name space;

transmitting a message by the backup server program to the file server to provide the requested file;

transmitting the requested file by the file server to the backup server program, wherein the requested file is not transferred to the backup client program; and storing by the backup server program the requested file in a storage device.

18. The article of manufacture of claim 17, wherein the backup client program is on a first computer machine, the backup server program is on a second computer machine, and the file server is on a third computer machine, wherein the first computer, second computer, and third computer communicate over a network system.

19. The article of manufacture of claim 18, wherein the first computer machine and second computer machine include a distributed file system (DFS) client program and wherein the file server includes a DFS server program, wherein the DFS client program interfaces the first and second computer machines with the DFS server program to allow the first and second computer machines to access files in the shared name space.

20. The article of manufacture of claim 18, further including the steps of:

issuing an authentication ticket to the client providing the client access to certain files in the shared name space;

generating a delegation token with the client, wherein the delegation token allows the backup server to access files in the shared name space on behalf of the client with a level of access not greater than the access provided by the client authentication ticket;

transmitting the delegation token from the client to the backup server;

transmitting the delegation token from the backup server to the file server;

determining with the file server whether the delegation token permits access to the requested file; and wherein the step of transmitting the requested file with the file server to the backup server including the backup server program occurs upon determining that the delegation token permits access to the requested backup file.

21. The article of manufacture of claim 17, wherein the backup client program and backup server program are on a first computer machine and the file server is on a second computer machine, wherein the first computer machine and second computer machine communicate over a network system.

22. The article of manufacture of claim 21, wherein the backup client program and backup server program communicate via a shared memory within the first computer machine.

23. The article of manufacture of claim 21, wherein the first computer machine includes a distributed file system (DFS) client program and wherein the file server includes a DFS server program, wherein the DFS client program interfaces the backup server program with the DFS server program to access files in the shared name space maintained on the file server, wherein the DFS program interfaces the file server and the first computer machine to make files in the shared name space maintained in the file server available to the first computer machine including the DFS client program.

24. The article of manufacture of claim 17, further comprising:

transmitting the requested file with the backup client program to the backup server program upon determining that the requested file is not maintained in the shared name space.

* * * * *